(12) United States Patent
Paternoster et al.

(10) Patent No.: US 11,396,175 B2
(45) Date of Patent: Jul. 26, 2022

(54) METHOD AND DEVICE FOR PRODUCING A THREE-DIMENSIONAL OBJECT

(71) Applicant: EOS GmbH Electro Optical Systems, Krailling (DE)

(72) Inventors: Stefan Paternoster, Andechs (DE); Stefan Grünberger, Munich (DE)

(73) Assignee: EOS GmbH Electro Optical Systems, Krailling (DE)

( * ) Notice: Subject to any disclaimer, the term of this patent is extended or adjusted under 35 U.S.C. 154(b) by 757 days.

(21) Appl. No.: 15/743,167

(22) PCT Filed: Jul. 14, 2016

(86) PCT No.: PCT/EP2016/001230
§ 371 (c)(1),
(2) Date: Jan. 10, 2018

(87) PCT Pub. No.: WO2017/008911
PCT Pub. Date: Jan. 19, 2017

(65) Prior Publication Data
US 2020/0079009 A1 Mar. 12, 2020

(30) Foreign Application Priority Data
Jul. 14, 2015 (DE) .......................... 102015213140.8

(51) Int. Cl.
*B29C 64/153* (2017.01)
*B33Y 30/00* (2015.01)
(Continued)

(52) U.S. Cl.
CPC ............ *B33Y 30/00* (2014.12); *B29C 64/153* (2017.08); *B33Y 50/02* (2014.12); *B22F 10/10* (2021.01);
(Continued)

(58) Field of Classification Search
None
See application file for complete search history.

(56) References Cited

U.S. PATENT DOCUMENTS 8,187,521 B2    5/2012 Larsson et al.
2005/0186538 A1*  8/2005 Uckelmann ............. B22F 10/20
                                                    433/201.1
(Continued)

FOREIGN PATENT DOCUMENTS

DE         1568472        2/2005
DE       102010013732    10/2011
DE       102012212587     1/2014

OTHER PUBLICATIONS

Chinese Office Action for Application No. 201680041241.8 dated May 22, 2020, 10 pages.
(Continued)

*Primary Examiner* — Monica A Huson
*Assistant Examiner* — Kelsey C Grace
(74) *Attorney, Agent, or Firm* — Seyfarth Shaw LLP (57) ABSTRACT

A method for producing a three-dimensional object by layer-wise applying and selectively solidifying a building material in powder form includes the steps of applying a layer of the building material over a working plane and selectively solidifying the layer at positions that correspond to a cross-section of the object to be produced by introducing energy and repeating the steps of applying and selectively solidifying until the object is completed. By doing so, the application step is carried out such that the application device moves at least twice over an area to be coated without an intermediate irradiation, and the step of selectively solidifying is carried out with an irradiation device that emits a radiation suited to solidify the building material.

10 Claims, 3 Drawing Sheets

(51) Int. Cl.
  *B33Y 50/02*   (2015.01)
  *B33Y 10/00*   (2015.01)
  *B22F 12/00*   (2021.01)
  *B22F 10/10*   (2021.01)

(52) U.S. Cl.
  CPC ........... *B22F 12/00* (2021.01); *B22F 2999/00* (2013.01); *B33Y 10/00* (2014.12)

(56) References Cited

U.S. PATENT DOCUMENTS

2013/0000549 A1   1/2013   Hartmann
2015/0202826 A1   7/2015   Paternoster et al.

OTHER PUBLICATIONS

3D Printing Technology (Revised Edition), Wang Yungan et al., Huazhong University of Science and Technology Press, 1st edition, 1st print, Jul. 2014, pp. 15-16, 6 pages.
Proceedings of the 2005 Symposium on Engineering Plastics Composites in China, "Factors Affecting the Precision of Selective Laser Sintered Plastic Parts," Yu Qian et al., Engineering Plastics Application Press, Oct. 2005, 6 pages.

* cited by examiner

METHOD AND DEVICE FOR PRODUCING A THREE-DIMENSIONAL OBJECT

TITLE

Technical Field of the Invention

The present invention relates to a method and a device for producing a three-dimensional object by applying layer by layer and selectively solidifying a building material in powder form.

Background of the Invention

Processes and devices of this type are used, for example, in rapid prototyping, rapid tooling or additive manufacturing. An example of such a method is known by the name "selective laser sintering or laser melting". In this method, a thin layer of a building material in powder form is repeatedly applied and the building material is in each layer selectively solidified by selective irradiation with a laser beam.

DE 10 2012 212 587 describes a device and a method for producing a three-dimensional object layer by layer by laser sintering, wherein a layer to be solidifyed is provided in the form of two sublayers applied one after the other, wherein between the steps of applying the two powder sublayers no energy for selectively solidifying the building material in powder form is introduced at least in a boundary region of the object to be produced.

Summary of the Invention

EP 1 568 472 A1 describes a method for producing a three-dimensional object layer by layer, wherein each position to be solidified is irradiated several times.

It is the object of the present invention to provide an improved method and an improved device for producing a three-dimensional object by applying layer by layer and selectively solidifying a building material in powder form.

The method according to the invention for producing a three-dimensional object by layer-wise applying and selectively solidifying a building material in powder form comprises the steps of applying a layer of the building material in powder form by means of an application device moving over a working plane and of selectively solidifying the applied powder layer at positions that correspond to a cross-section of the object to be produced by introducing energy by means of an irradiation device which emits a radiation suited to solidify the building material. The steps of applying and selectively solidifying are repeated until the object is completed. For at least one layer, preferably a plurality of layers and particularly preferred all layers, the application step is carried out such that the application device moves at least twice over an area to be coated without energy being introduced by the irradiation device in-between. For at least one layer, preferably a plurality of layers and particularly preferred all layers, the step of selectively solidifying is carried out such that the irradiation device moves at least (preferably: exactly) twice over an area to be irradiated without new building material being applied in-between. The irradiation device is preferably designed as a row irradiation device.

Thus, the irradiation device moves at least twice over the area to be irradiated, wherein energy is introduced in at least one of its two passages, preferably in both.

The invention thus combines an application device that moves at least twice over the area to be coated (i.e. where powder material is to be applied) with an irradiation device which also moves twice over the area to be irradiated. By doing so, each of these two components (application device and irradiation device) is coordinated in its motion with the motion of the respective other component. According to the invention, this is implemented in that no energy is introduced by the irradiation device between the two passages of the application device. In this context, the term "(in-)between" refers to the location. The term implies that at any location which the application device moves over, the application device first moves twice over said location before energy is introduced by means of the irradiation device at said location.

The coordinated motions of the two components can be realized in particular by the fact that the two components are arranged relative to each other one behind the other in the same configuration, which means that the application device is always positioned to the left of the irradiation device or alternatively the irradiation device is always to the left of the application device. As a result, moving of the two components can be realized in a particularly uncomplicated manner; the two of them never get in the way of each other upon their respective motion.

Preferably, the application device applies a first powder sublayer upon its first movement over the area to be coated and applies a second powder sublayer upon its second movement over the area to be coated.

By doing so, among other things, the vertical temperature distribution within a layer can be homogenized and the quality of the object can thus be improved.

Preferably, the height of the application device above the working plane, i.e. its distance from the working plane, is changed before moving the application device over the working plane.

As a result, the desired layer thickness of the applied powder layer can be adjusted.

In general, the invention thus also comprises a method for producing a three-dimensional object by layer-wise applying and selectively solidifying a building material in powder form, which method comprises the steps of: applying a layer of the building material in powder form by means of an application device moving over a working plane, selectively solidifying the applied powder layer at positions that correspond to a cross-section of the object to be produced and repeating the steps of applying and selectively solidifying until the object is completed, wherein the application device is raised and/or lowered by a predetermined amount before applying a layer.

Preferably, for at least one layer, preferably a plurality of layers and particularly preferred all layers, the step of selectively solidifying is carried out such that energy is introduced at least twice by the irradiation device (namely, in particular, once during its first passage and once during its second passage) without new building material being applied in-between. In this context, too, the term "in-between" refers to the location. The term implies that at any location which the irradiation device moves over, the irradiation device first moves twice over said location before new building material is applied there by means of the application device.

This makes it possible, for example, to combine the effects of double coating and double exposure in a simple manner, wherein this is done in a coordinated manner and it is ensured that at each position of a layer of the building material, first building material is applied (in particular twice) and then irradiated twice. It is therefore ensured that for each double-irradiated location, building material has been applied there (in particular twice) before.

Preferably, the height of the irradiation device, i.e. its distance, above (or relative to) the working plane is changed before moving the irradiation device over the working plane.

By doing so, the focal plane of the irradiation device can be adapted to the current height (i.e. plane) of the layer to be irradiated.

Thus, the invention also comprises a method for producing a three-dimensional object by layer-wise applying and selectively solidifying a building material in powder form, which method comprises the steps of: applying a layer of the building material in powder form by means of an application device moving over a working plane, selectively solidifying the applied powder layer at positions that correspond to a cross-section of the object to be produced by means of an irradiation device moving over the working plane and repeating the steps of applying and selectively solidifying until the object is completed, wherein the irradiation device is raised and/or lowered before moving over the working plane.

Preferably, the irradiation device preheats the building material without solidifying it upon its first movement over the area to be irradiated and solidifies the building material at those positions that correspond to the cross-section of the object to be produced upon its second movement over the area to be irradiated.

Thus, for example, a separate heating device for the applied powder layer can be rendered superfluous or its heating effect can be encouraged.

In the case of such a preheating, it is possible, for example, to preheat the positions that correspond to the cross-section of the object to be produced but also (alternatively or additionally) regions in the area of the building material can be preheated (in particular selectively), specifically with the purpose of compensating for temperature inhomogeneities in the area. Thus, heat sinks within the area can be easily compensated for.

Preferably, the irradiation device only partially solidifies the building material at those positions that correspond to the cross-section of the object to be produced upon its first movement over the area to be irradiated and completely solidifies the building material at those positions that correspond to the cross-section of the object to be produced upon its second movement over the area to be irradiated. In this particular context, by the term "partially solidifying" it is to be understood that only an insufficient (partial) energy is introduced at the positions that correspond to the cross-section of the object to be produced. This (partial) energy is thus not sufficient to completely or partially melt the building material in powder form to such an extent that it solidifies sufficiently strong (i.e. as desired) upon the process of cooling. The complete fusing thus takes place upon the second passage of the irradiation device with the aid of an additional (partial) energy so that the two (partial) energies substantially add up and correspond at the minimum to the energy required for completely solidifying the building material in powder form in an irradiation process.

In this way, the energy required for completely solidifying the building material can thus be separated into two sub-exposures.

Preferably, the application device and the irradiation device are moved in such a way that an application process and an irradiation process take place simultaneously at different positions in the working plane.

As a result, the process speed can be considerably increased and the production time of the object can be reduced.

The computer program according to the invention can be loaded into a programmable control unit and comprises program code means for executing all steps of a method according to one of claims 1 to 10 when the computer program is executed on the control unit.

This makes it possible to carry out the method according to the invention in a program-controlled manner.

The control unit according to the invention is provided for a device for producing a three-dimensional object by selectively solidifying of a building material layer by layer, wherein the device comprises an application device that can be moved over a working plane for applying a layer of the building material to the working plane and an irradiation device for selectively solidifying the applied layer at positions that correspond to a cross-section of the object to be produced by introducing energy by means of the irradiation device. The control unit is configured to control the device such that it repeats the steps of applying and selectively solidifying until the object is completed, that it carries out the application step for at least one layer, preferably a plurality of layers and particularly preferred all layers such that the application device moves at least twice over an area to be coated without energy being introduced by the irradiation device in-between and that it carries out the step of selectively solidifying by means of an irradiation device that moves at least twice over the area to be irradiated, which irradiation device emits a radiation suited to solidify the building material.

Thus, a control unit is provided which is capable of controlling a device for producing a three-dimensional object such that it carries out the method according to the invention.

The device according to the invention for producing a three-dimensional object by selectively solidifying of a building material layer by layer comprises an application device that can be moved over a working plane for applying a layer of the building material to the working plane and an irradiation device for selectively solidifying the applied layer at positions that correspond to a cross-section of the object to be produced by introducing energy by means of the irradiation device. The device is configured and/or controlled to repeat the steps of applying and selectively solidifying until the object is completed, to carry out the application step for at least one layer, preferably a plurality of layers and particularly preferred all layers such that the application device moves at least twice over an area to be coated without energy being introduced by the irradiation device in-between and to carry out the step of selectively solidifying by means of an irradiation device that moves at least twice over the area to be irradiated, which irradiation device emits a radiation suited to solidify the building material.

Thus, a device is provided which is capable of implementing the method according to the invention.

Preferably, the irradiation device can be moved separately from the application device over the working plane.

By doing so, for example, double coating and double exposure can be combined in a simple manner without interfering with each other.

Preferably, the irradiation device can be moved over the working plane together with the application device.

By doing so, the irradiation device and the application device can operate simultaneously, which increases the process speed and reduces the production time of the object.

BRIEF DESCRIPTION OF THE DRAWINGS

Further features and expediencies of the invention are set out in the description of exemplary embodiments with the aid of the attached drawings. The figures are not necessarily to be understood as drawn to scale. In particular, thicknesses of the layers may vary, depending on whether there are non-solidified or solidified areas.

FIGS. 3a and b schematically depict a procedure of a method according to a second embodiment of the present invention.

DETAILED DESCRIPTION OF THE EMBODIMENTS

Figure 1:
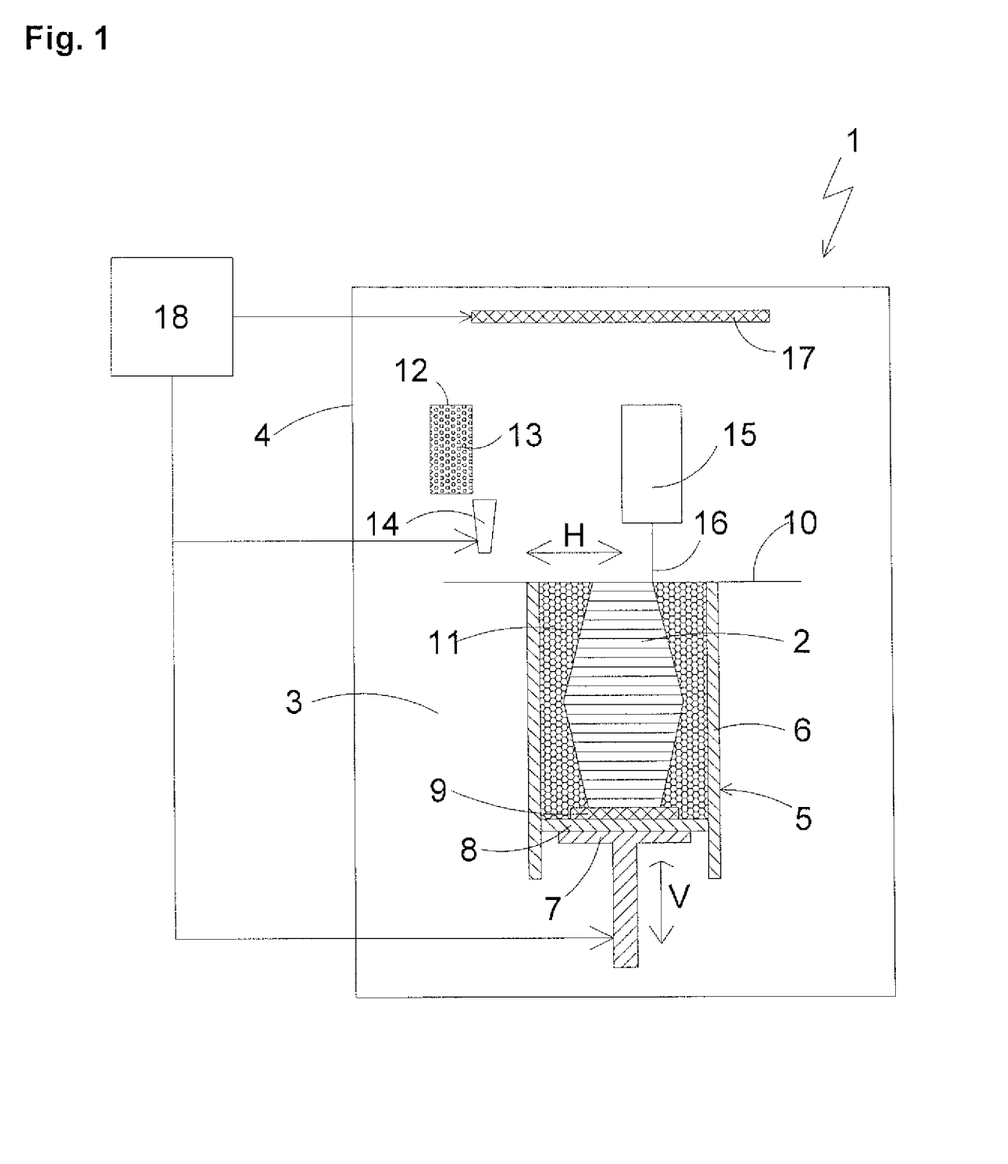
FIG. 1 shows a schematic view, partially in cross-section, of an exemplary embodiment of a device for producing a three-dimensional object layer by layer, which device is configured to implement a method according to the invention.

Hereafter, an exemplary embodiment of a device 1 is described with reference to FIG. 1, which device 1 is configured to implement a method according to the invention. The device shown in FIG. 1 is a laser sintering or laser melting device 1. For building an object 2, it comprises a processing chamber 3 with a chamber wall 4.

A container 5 open to the top with a wall 6 is arranged in the processing chamber 3. In the container 5 a support 7 is arranged that can be moved in a vertical direction V and to which a base plate 8 is attached which seals the container 5 at the bottom and thus forms the bottom thereof. The base plate 8 can be formed as a plate separately from the support 7 which plate is fixed to the support 7, or it can be integrally formed with the support 7. Depending on the powder and process used, a building platform 9 can also be arranged on the base plate 8 on which the object 2 is built. However, the object 2 can also be built on the base plate 8 itself, which then serves as a building platform. In FIG. 1, the object 2 to be formed in the container 5 on the building platform 9 is shown below a working plane 10 defined by the upper edge of the container in an intermediate state with several solidified layers, surrounded by building material 11 that remained unsolidified.

The laser sintering device 1 further comprises a storage container 12 for a building material in powder form 13 which can be solidified by electromagnetic radiation and an application device 14 which can be moved in a horizontal direction H for applying the building material 13 to the working plane 10. Preferably, the application device 14 extends transversely to its direction of movement over the entire area to be coated.

The laser sintering device 1 further comprises an irradiation device 15 which can also be moved in a horizontal direction H, which irradiation device produces a laser radiation that is focused upon the working plane 10. The irradiation device 15 is preferably designed as a row irradiation device which is capable of irradiating a line that extends transversely to its direction of movement and over the entire region to be irradiated.

Furthermore, a radiant heater 17 is arranged in the processing chamber for preheating an applied layer prior to its solidification. The radiant heater is designed as an infrared heater, for example.

Furthermore, the laser sintering device 1 comprises a control unit 18 by which the individual components of the device 1 can be controlled in a coordinated manner in order to implement the building process. The control unit can comprise a CPU, the operation of which is controlled by a computer program (software). The computer program can be stored separately from the device on a storage medium from which it can be loaded into the device, in particular into the control unit 18.

In operation, in order to apply a powder layer, the support 7 is first lowered by an amount that corresponds to the desired layer thickness. Then, a layer of the building material in powder form 13 is applied by moving the application device 14 over the working plane 10. Application takes place at least over the entire cross-section of the object 2 to be produced, preferably over the entire build area, i.e. the part of the working plane 10 located within the opening of the container. The applied powder layer is preheated by means of the radiant heater 17. The irradiation device then moves over the applied and preheated powder layer and solidifies the building material in powder form 13 at those positions that correspond to the cross-section of the object 2 to be produced by selectively irradiating said positions with the laser radiation. These steps are repeated until the object 2 is completed and can be removed from the building space.

According to the present invention, the steps of applying and solidifying are carried out such that the application device first moves twice over an area to be coated without an intermediate irradiation, and afterwards the irradiation device moves twice over the area to be irradiated.

Figure 2:
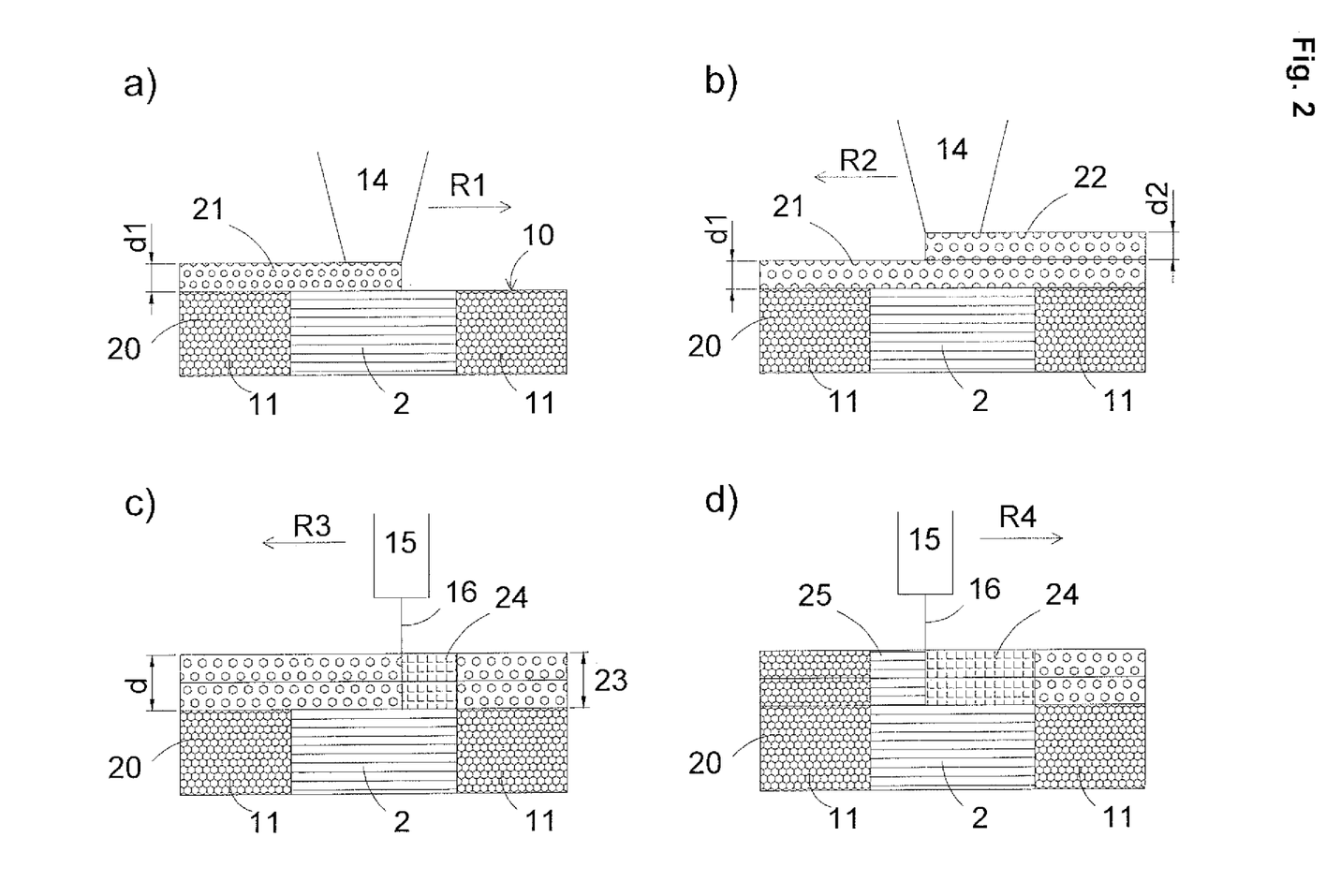
FIGS. 2a to d schematically depict a procedure of a method according to a first embodiment of the present invention.

FIG. 2 schematically depicts a procedure of a method according to a first embodiment of the present invention. FIGS. 2a to 2b each show a schematic view in cross-section of a part of the build area located in the working plane 10.

After applying and selectively solidifying of a powder layer 20 the solidified region located therein, which forms a part of the object 2 to be produced, is surrounded by unsolidified powder 11. At the beginning of the step shown in FIG. 2a the application device 14 is arranged to the left of the build area 10 and the irradiation device 15 is arranged to the right.

The support 7 is first lowered by an amount d1. Then, as shown in FIG. 2a, a first powder layer 21 of the building material 13 with a first thickness d1 is applied to the previously applied and selectively solidified powder layer 20 by means of a movement of the application device 14 over the build area 10 in a first application direction R1.

After application of the first powder layer 21 the support 7 is lowered by an amount d2. Then, as shown in FIG. 2b, the application device 14 is moved in a second application direction R2, which is preferably opposite to the first application direction R1. By doing so, the application device applies a second powder layer 22 of the building material 13 with a second thickness d2.

In this way, altogether, a powder layer 23 to be solidified is provided, the thickness d of which powder layer 23 is equal to the sum of the first thickness d1 and the second thickness d2. The first and second powder layers 21, 22 are quasi only powder sublayers of the one powder layer 23 to be jointly solidified.

During and after application of the first and the second powder sublayer 21, 22 the applied powder is preheated by the radiation heater 17.

Only after the application device 14 has moved twice over the build area 10 and has applied the two powder sublayers 21, 22 without an intermediate irradiation, the irradiation device moves, as shown in FIG. 2c, over the build area in a first irradiation direction R3, which is preferably equal to the second application direction R2, and selectively irradiates the applied total powder layer 23. While doing so, the amount of energy introduced by the laser radiation 16 is set such that the building material in powder form 13 is not completely solidified. As a result, at least a partially solidified powder region 24 is formed in the applied total powder layer 23 depending on the structure of the object 2 to be produced or the number of objects 2 to be produced simultaneously.

After the first sub-exposure the irradiation device moves over the build area in a second irradiation direction R4, which is preferably equal to the first application direction R1, and selectively irradiates the applied total powder layer 23, as shown in FIG. 2d. While doing so, the amount of energy introduced by the laser radiation 16 is set such that the building material in powder form 13 is completely solidified at positions corresponding to the cross-section of the object 2 to be produced. As a result, a completely solidified powder region 25 is formed in the applied total powder layer 23 that already forms part of the object to be produced and which widens up to the entire cross-section of the object 2 or objects to be produced in the course of the second sub-exposure, whereas unsolidified building material 11 remains outside the object 2.

Thus, the initial state is obtained, the support is again lowered by d1 and the above-described steps are repeated, starting with the step shown in FIG. 2a.

Instead of lowering the support 7 two times, by d1 and d2, respectively, the support can also be lowered only once by the total amount d=d1+d2. However, the application device 14 must then be raised or lowered after the application of each powder sublayer. For example, prior to the step shown in FIG. 2a, not the support 7 is lowered by d1, but the application device 14 is raised by d1 so that it applies the first powder sublayer 21 with the thickness d1. Between the steps shown in FIGS. 2a and 2b, the support 7 is then lowered by d=d1+d2 and the application device 14 is lowered by d1 to apply the second powder sublayer 22 with the thickness d2. Prior to the next step of FIG. 2a the application device 14 must be raised by d1 again so that it can again apply the first powder sublayer 21 with the thickness d1 in the next run.

No height adjustment is required for the irradiation device 15 in this embodiment since the surface of the total powder layer 23 is at the same height at both passages of the irradiation device 15.

In this method, a double coating (FIGS. 2a, 2b, application of two sublayers without an intermediate irradiation) and a double exposure (FIG. 2c, 2d, two partial irradiations without an intermediate coating) are carried out alternately.

As a result, the advantages of a double or multiple coating and a double or multiple exposure can be combined in a simple manner.

Double or multiple coating, that is to say the application of one layer of the building material in powder form to be solidified in the form of two or more successively applied sublayers, without an intermediate irradiation, makes it possible to obtain a more homogeneous temperature distribution across the thickness of the applied layer than when applying a single layer with a corresponding overall thickness. As a result, the mechanical properties of the object produced can be improved. Among other things, the surface quality can be improved and depressions (orange skin) can be avoided.

Double or multiple exposure, i.e. the solidification of a layer of the building material in powder form to be solidified in the form of two or more successive partial irradiations (sub-exposures), can also improve the quality of the objects produced:

The simplest possibility is to divide the energy required for the complete solidification of the building material in powder form into two portions, which portions are introduced into the layer one after the other. Altogether, the double exposure makes it possible to introduce larger amounts of energy into the layer than in a single exposure. However, also when dividing the amount of energy that could be provided by a single exposure advantages arise due to dividing the amount of energy into two portions, for example with regard to the temperature distribution in the layer and a better quality of the objects produced resulting therefrom.

However, alternatively to the above-described partial or complete solidification of the building material in powder form, further effects can be also be achieved by the first sub-exposure.

Thus, for example, the irradiation device can preheat the building material without solidifying it upon its first movement over the area to be irradiated and solidify the building material at those positions that correspond to the cross-section of the object to be produced upon its second movement over the area. Said preheating can be implemented alternatively or in addition to preheating by the radiant heating. By doing so, for example the entire applied layer can be preheated by the irradiation device, wherein the temperature distribution across the layer can also be controlled by controlling the irradiation. Alternatively, only the region to be solidified or only the region that is not to be solidified can be preheated, wherein also a distance can be kept to the outer contour of the region to be solidified or a border extending beyond said contour can also be heated.

Alternatively, for example, the irradiation device can change an absorbency of the building material upon first moving over the area to be irradiated and solidify the building material only at the positions of enhanced absorbency upon its second movement over the area. For that to happen, the second sub-exposure does not have to be a selective irradiation.

In the step shown in FIG. 2c, the irradiation device 15 preferably moves over the build area in the same direction R3=R2 in which the application device 14 has moved over the build area before in the step shown in FIG. 2b. Moreover, in the step shown in FIG. 2a, the application device 14 preferably moves over the build area in the same direction R1=R4 in which the irradiation device 15 has moved over the build area before in the step shown in FIG. 2d. In doing so, it is not necessary for the one module to wait for the other one to move completely over the build area, but rather both modules can also move over the build area at least partially simultaneously.

Figure 3:
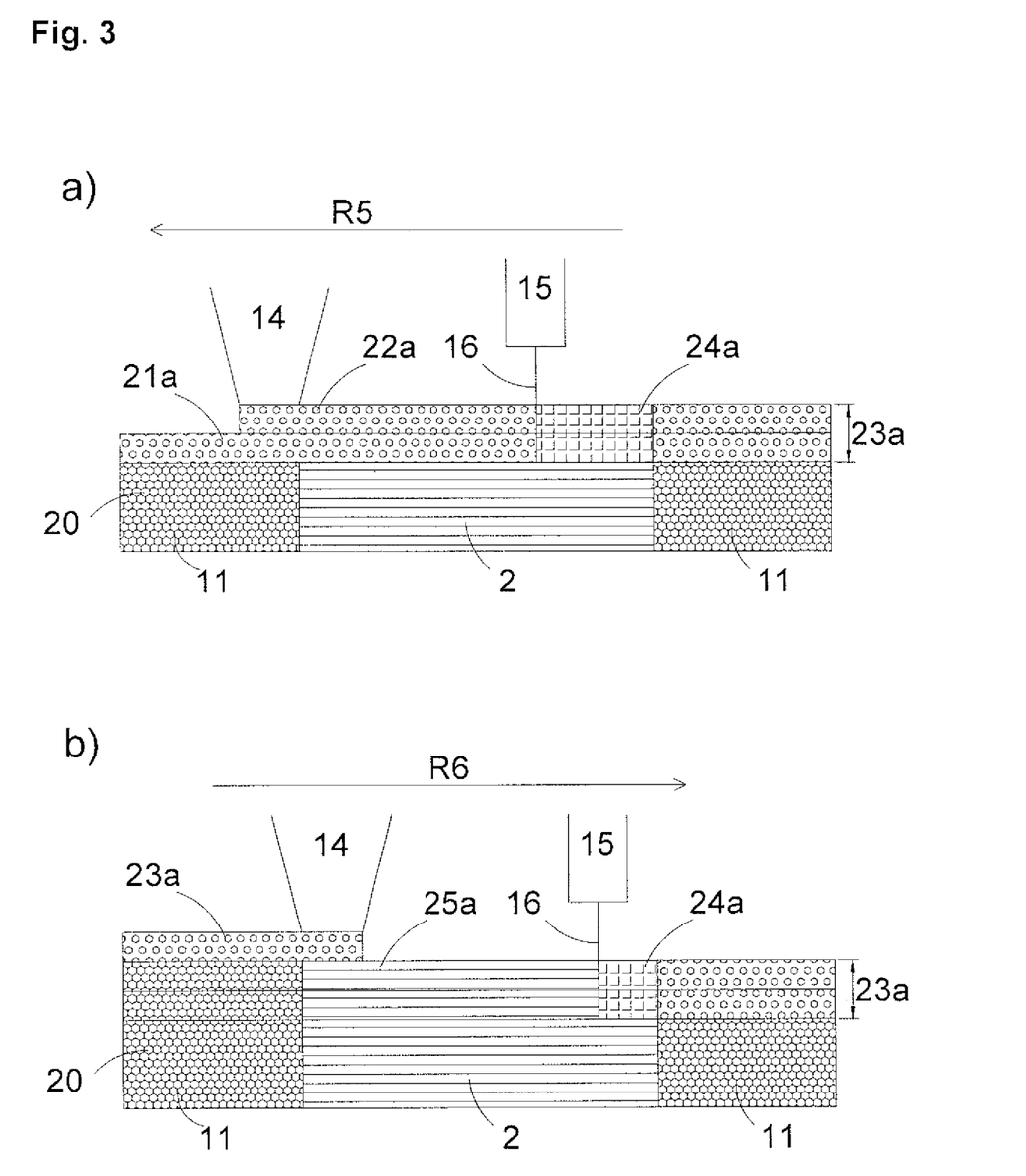

FIG. 3 schematically shows the procedure according to a second embodiment of the present invention that differs from the first embodiment in that the application device 14 and the irradiation device 15 move together over the build area instead of separately from one another. All other features of the first embodiment may also be applied to the second embodiment.

FIG. 3a shows a process step in which the process steps shown in FIG. 2b and FIG. 2c are combined with one another. The application device 14 has already applied a first powder sublayer 21a in an earlier process step and now moves in a first direction of movement R5 over the build area in order to apply a second powder sublayer 22a. Behind the application device 14, the first powder sublayer 21a and the second powder sublayer 22a together already form a total powder layer 23a to be selectively solidified.

While the application device 14 still moves over the build area for applying the second powder layer 22a, the irradiation device 15, too, already moves at a distance behind the application device in the first direction of movement R5 over the region of the total powder layer 23a that is already applied completely and selectively irradiates said area. Here, too, the amount of energy introduced by the laser radiation 16 is preferably adjusted such that the building material in powder form 13 is not completely solidified, as a result of which a partially solidified powder region 24a is formed in the total powder layer 23a.

The distance between the application device 14 and the irradiation device 15 is preferably selected such that the powder located between them can be sufficiently preheated by the radiation heater 17 in the time between application and irradiation.

After having moved at least over the entire region to be irradiated, preferably the entire build area, the irradiation device again moves over the build area in a second direction of movement R6, which is preferably opposite to the first direction of movement R5, and performs a second sub-exposure as described above with regard to FIG. 2d. As a result, a completely solidified powder region 25a is formed in the total powder layer 23a that already forms part of the object 2 to be produced and which widens up to the entire cross-section of the object 2 to be produced in the course of the second sub-exposure, whereas unsolidified building material 11 remains outside the object 2.

While the irradiation device 15 still moves over the build area for implementing the second sub-exposure, the application device 14 already moves at a distance behind the irradiation device over the already completely irradiated region of the total powder layer 23a and applies a further first powder layer 21b for the next total powder layer.

The distance between the irradiation device 15 and the application device 14 is, for example, selected such that the application of the first powder sublayer 21b neither disturbs the solidification of the regions of the total powder layer 23a heated by the laser radiation 16, nor the newly applied powder is adversely affected by the solidified regions 25a of the overall powder layer 23a that are still hot.

After the application device 14 has moved at least over the entire region to be irradiated, preferably the entire build area, the initial state is reached and the process described above is repeated, beginning with the step shown in FIG. 3a.

If, in the present embodiment, the support 7 is lowered by d1 and d2 for applying the powder sublayers 21 and 22, respectively, the problem arises that the surface of the total powder layer 23a is located at different levels at the two passages of the irradiation device 15 and the focus for the laser radiation would have to be adjusted.

Therefore, in the present embodiment, the support 7 is preferably lowered only before the step shown in FIG. 3a by the total amount d=d1+d2. The application device 14 is raised by d1 before the step shown in FIG. 3b and lowered again by d1 after this step. The powder sublayers 21, 22 are thus applied with the thicknesses d1, d2, respectively. On the other hand, the height position of the total powder layer 23a remains the same at both passages of the irradiation device 15 so that no readjustment of the focus is required.

Alternatively, the support can be lowered for both powder sublayers 21, 22 by the respective thicknesses d1, d2 and the application device can remain unchanged with respect to its height setting. The irradiation device is then preferably raised by d1 before the step shown in FIG. 3a and lowered by d1 before the step shown in FIG. 3b.

Any combination of those approaches is also possible to ensure that the desired layer thicknesses are applied and at the same time the surface of the total powder layer is always located in the focus plane of the laser radiation.

Thus, a double coating (left halves of FIG. 3a, 3b, application of two sublayers without an intermediate irradiation) and a double exposure (right halves of FIG. 3a, 3b, two sub-exposures without an intermediate coating) are carried out alternately in the present embodiment as well. Here, the term "intermediate" refers to each separate location of the build area. At different locations for example, an application and an irradiation can take place at the same time in the present embodiment.

Therefore, with the second embodiment, the same effects can be obtained as with the first embodiment. In addition, an acceleration of the process can be achieved because the application device and the irradiation device do not move successively, but at least at the same time over the build area. As a result, the duration of the production of the object and the costs for the object can be reduced.

The above-described embodiments have in common that the application device moves at least twice over an area to be coated without an intermediate introduction of energy by means of the irradiation device and the energy is introduced at least twice by means of the irradiation device without new powder being applied in-between. The method according to the invention can be modified at will as long as this basic principle is fulfilled. Thus, the application device or the irradiation device can also move more than twice over the area to be coated and to be irradiated, respectively, without an intermediate irradiation and coating, respectively.

According to the above embodiments, two powder sublayers with the thicknesses d1 and d2 are applied. These thicknesses may be the same or different from each other. One of the thicknesses can also be equal to zero, i.e. that the application device in this case performs a neutral run without applying powder. Likewise, the irradiation device can perform a neutral run without irradiating.

In the above embodiments it is described that the application device 14 and/or the irradiation device 15 are raised or lowered before starting a partial coating or a partial irradiation, respectively, i.e. each time before moving over the working plane.

The present invention does not have to be applied to all layers of which an object is formed. However, it is implemented for at least one of these layers, preferably for a plurality of layers and in a particularly preferred manner for all layers.

Even though the present invention was described with regard to a laser sintering device or a laser melting device, it is not restricted to laser sintering or laser melting. It can be applied to any method for producing a three-dimensional object by layer-wise applying and selectively solidifying a building material in powder form by selectively introducing energy.

The irradiation device can comprise, for example, one or several gas or solid state lasers or any other kinds of laser, such as laser diodes, in particular VCSEL (Vertical Cavity Surface Emitting Laser) or VECSEL (Vertical External Cavity Surface Emitting Laser). In general, any device may be used as an irradiation device with which energy can be selectively introduced as wave or particle radiation to a layer of the building material. Instead of a laser, for example, a different light source, an electron beam or any other source of energy or radiation can be used which is suited to solidify the building material.

Various kinds of powders, in particular metal powders, plastic powders, ceramic powders, sand, filled or mixed powders, can be used as a building material.

The invention claimed is:

1. A method for producing a three-dimensional object by layer-wise applying and selectively solidifying a building material in powder form, comprising the steps of:
    applying a layer of the building material in powder form by an application device moving over a working plane;
    selectively solidifying the applied powder layer at positions that correspond to a cross-section of the object to be produced by introducing energy by an irradiation device that emits radiation suited to solidify the building material, the irradiation device being mounted on an elongated member extending across the working plane and emitting a radiation that forms an irradiation line in the working plane in the working plan and moving over the working plane when introducing energy into the applied layer of the building material, the irradiation device on the member moving in tandem with the application device; and
    repeating the steps of applying and selectively solidifying until the three-dimensional object is completed,
    wherein, for at least one layer, the step of applying the layer of building material in powder form is carried out such that the application device moves at least twice over an area to be irradiated and depositing powder in each of the at least twice movements without energy being introduced by the irradiation device in-between the at least two movements of the application device, and
    wherein, for at least one layer, the step of selectively solidifying is carried out such that the irradiation device moves at least twice over an area to be irradiated without new building material being applied in-between the at least two movements of the irradiation device, a first movement of the irradiation device applying energy to the area being irradiated below a melt point of the building material and the at least twice movement of the irradiation device applying further energy to the area being irradiated to melt the building material.

2. The method according to claim 1, wherein the application device applies a first powder sublayer upon a first movement over the area to be coated and applies a second powder sublayer upon a second movement over the area to be coated.

3. The method according to claim 1, wherein a height of the application device above the working plane is changed before moving the application device over the working plane.

4. The method according to claim 1, wherein a height of the irradiation device above the working plane is changed before moving the irradiation device over the working plane.

5. The method according to claim 1, wherein the irradiation device preheats the building material without solidifying the building material upon a first movement over the area to be irradiated; and
    wherein the irradiation device solidifies the building material at the positions that correspond to the cross-section of the object to be produced upon a second movement over the area to be irradiated.

6. The method according to claim 1, wherein the irradiation device only partially solidifies the building material at the positions that correspond to the cross-section of the object to be produced upon a first movement over the area to be irradiated; and
    wherein the irradiation device completely solidifies the building material at the positions that correspond to the cross-section of the object to be produced upon a second movement over the area to be irradiated.

7. The method according to claim 1, wherein the application device and the irradiation device are moved such that an application process and an irradiation process take place simultaneously at different positions of the working plane.

8. The method according to claim 1, wherein the application device is raised and/or lowered by a predetermined amount before applying a layer.

9. The method according to claim 1, wherein the irradiation device is raised and/or lowered before being moved over the working plane.

10. A method for producing a three-dimensional object by selectively solidifying a building material layer by layer, comprising:
    providing an application device that can be moved over a working plane for applying a layer of the building material to the working plane;
    providing an irradiation device for selectively solidifying the applied layer at positions that correspond to a cross-section of the object to be produced by introducing energy by the irradiation device,
    mounting the irradiation device extending across the working plane and moving the irradiation device together with the application device in tandem;
    selectively solidifying areas of the building material correspong to cross-sections of the three dimensional object;
    repeating the steps of applying and selectively solidifying until the three dimensional object is completed, such that the application device moves at least twice over an area to be irradiated without energy being introduced by the irradiation device in-between the at least twice movements; and
    selectively solidifying with the irradiation device in at least twice movements over the area to be irradiated, a first movement of the irradiation device applying energy to heat the powder irradiated to a temperature below melting and a second movement of the irradiation device applying further energy to melt the powder for solidification.

* * * * *